United States Patent [19]
Niitsu

[11] Patent Number: 6,139,340
[45] Date of Patent: Oct. 31, 2000

[54] EJECT MECHANISM WITH ROTATABLE PUSH BUTTON

[75] Inventor: Toshihiro Niitsu, Machida, Japan

[73] Assignee: Molex Incorporated, Lisle, Ill.

[21] Appl. No.: 09/468,272

[22] Filed: Dec. 20, 1999

[30]     Foreign Application Priority Data

Dec. 18, 1998   [JP]   Japan ................... 10-375903

[51] Int. Cl.[7] ................................................. H01R 13/62
[52] U.S. Cl. ............................................................ 439/159
[58] Field of Search ............................................. 439/159

[56]              References Cited

U.S. PATENT DOCUMENTS

| | | | |
|---|---|---|---|
| 5,026,296 | 6/1991 | Hashiguchi | 439/159 |
| 5,145,389 | 9/1992 | Okubo | 439/159 |
| 5,443,395 | 8/1995 | Wang | 439/159 |
| 5,492,480 | 2/1996 | Fusselman et al. | 439/157 |
| 5,653,603 | 8/1997 | Sasao et al. | 439/159 |
| 5,997,325 | 12/1999 | Hara | 439/159 |
| 6,000,958 | 12/1999 | Ishida et al. | 439/159 |

*Primary Examiner*—Neil Abrams
*Assistant Examiner*—Thanh-Tam Le
*Attorney, Agent, or Firm*—Stacey E. Caldwell

[57]              ABSTRACT

Disclosed is a connector equipped with an improved ejection mechanism wherein the ejection mechanism includes an ejection rod and a push button directly mounted to the end of the ejection rod for movement between an operative and an inoperative position. The ejection rod has a rectangular flat head formed at one end thereof, and the push button has a corresponding head-retaining space formed therein for receiving the rectangular flat head of the ejection rod. The head-retaining space forms a generally L-shaped slot and includes a first head-holding section extending in a direction generally along the longitudinal dimension of the push button, and a second head-holding section extending generally perpendicular to the first head-holding section.

The push button is in its operative position when the head of the ejection rod is in the first head-holding section, and the push button is in its inoperative position when the head of the ejection rod is in the second head-holding section. The push button may further include a resilient section adjacent to the head-retaining space adapted to apply a resilient force to the head of the ejection rod during movement of the push button between its operative and inoperative positions.

6 Claims, 5 Drawing Sheets

EJECT MECHANISM WITH ROTATABLE PUSH BUTTON

FIELD OF THE INVENTION

This invention relates to the art of electrical connectors and, particularly, to a connector for receiving a media card such as a card sized according to the PCMCIA standard (including memory devices and all kinds of IC cards), all kinds of MD, DVD and other input/output media, wherein the card-receiving connector is equipped with an eject mechanism.

BACKGROUND OF THE INVENTION

A convention card-receiving connector is equipped with an eject mechanism for ejecting a card from the connector. A typical eject mechanism comprises a plastic push button for manual actuation by a user which is attached to the end of an ejection rod. The push button is attached to the end of the ejection rod by a plastic piece integrally connected to the end of the ejection rod and a spring member which resiliently connects the push button to the plastic piece and which allows the push button to move between two functional positions relative to the rod (see for example, Japanese Patent Laid-Open Nos.9-167654, 10-144393 and other publications). To eject a card, the push button is in a first, operative position, aligned with the ejection rod, which position allows the actuation of the ejection rod and ejection of the card. When the card is in use and ejection is not desired, the push button is moved to its inoperative position, out of alignment with the ejection rod, by inclining the push button against the spring member,. The above-described conventional eject mechanism requires the plastic piece and the spring member in addition to the push button and the ejection rod. These parts increase the number of parts to be assembled, the number of assembling steps and, accordingly, the manufacturing costs associated with the connector.

SUMMARY OF THE INVENTION

One object of the present invention is to provide a connector equipped with an ejection mechanism having a minimum number of components. To attain this object, a connector equipped with an eject mechanism according to the present invention is so designed that the push button is connected directly to the end of the ejection rod in a rotatable fashion with no additional components. The eject mechanism includes an elongated ejection rod mounted along one side of the connector and an associated push button attached directly to the ejection rod for rotatable movement relative to the ejection rod between an operative and an inoperative position, wherein the ejection rod has a flat head formed at one end, and the push button has a corresponding head-retaining space formed therein for receiving the flat head of the ejection rod, wherein the head-retaining space of the push button includes a generally L-shaped slot comprising a first head-holding section extending in a direction along the longitudinal dimension of the push button, a second head-holding section extending generally perpendicular to the longitudinal dimension of the push button, and a resilient section adjacent the L-shaped slot adapted to apply a resilient force to the head of the ejection rod during movement of the push button between its operative and inoperative positions, whereby the push button is in its operative position in alignment with the ejection rod when the head of the ejection rod is in the first head-holding section, and the push button is in its inoperative position and out of alignment with the ejection rod when the head of the ejection rod is in the second head-holding section.

The head-retaining space of the push-button is configured such that the head of the ejection rod clicks when moving between the first head-holding section and the second head-holding section, thereby providing tactile feedback indications when the push button is moved between its operative and inoperative positions.

Since the push button is connected directly to the end of the ejection rod in a rotatable fashion, no additional parts are needed. Thus, the number of parts is reduced to a minimum, permitting the number of assembly steps and the associated manufacturing costs to be significantly reduced.

Other objects, features and advantages of the present invention will be apparent from the following description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
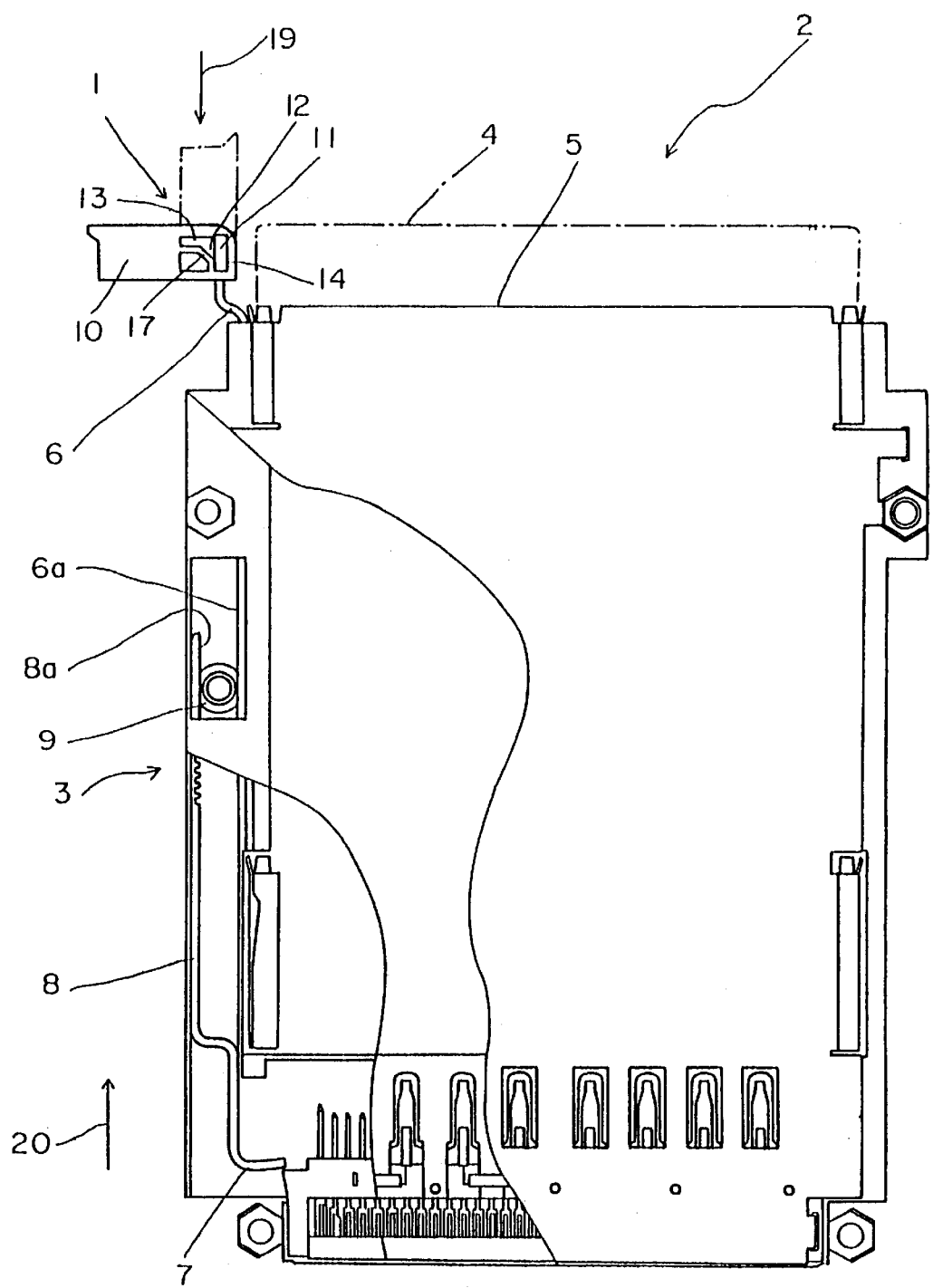
FIG. 1 is a plan view of a card connector equipped with an ejection mechanism according to a first embodiment of the present invention, partially broken away to show the inside.

According to the present invention, and referring first to FIG. 1, a card connector adapted to receive a card 4 designed according to the PCMCIA Standard has an ejection mechanism 3 attached along one side of a card-receiving body. The ejection mechanism 3 includes a two-part elongated ejection rod 6 and 8 comprising a first racked-section 6a and a second racked-section 8a, and an intervening pinion gear 9 engaged with racks 6a and 8a of the first and second ejection rod parts 6 and 8. A hook 7 is formed on one end of rod part 8 for contacting and ejecting a card 4 at a leading edge thereof. A generally rectangular push button device 1 includes ejection rod part 6 and a plastic push button 10 which is mounted directly on ejection rod 6 for rotatable movement between an operative and an inoperative position Ejection rod 6 includes a generally rectangular flat head 11 formed at one end thereof opposite rack 6a. Push button 10 includes a head-retaining space 12 formed at one end thereof which receives rectangular flat head 11 of ejection rod part 6, thereby connecting ejection rod 6 directly to push button 10.

Push button 10 is molded of plastic and head-retaining space 12 includes a first head-holding section 13 extending in a direction along the longitudinal dimension of the push button and a second head-holding section 14 extending generally perpendicular to the first head-holding section 13. As seen in FIGS. 2 through 6, head-holding sections 13 and 14 intersect each other to form U-shaped spaces or engagement recesses 15 and 16 at their ends. The head-retaining space 12 further includes a resilient section 17 in the form of an opening and an oblique wall 17a formed adjacent the L-shaped slot.

In ejecting card 4 from card connector 2, push button 10 is put in its operative position, i.e. such that the rectangular head is in first head-holding section 13 as shown in broken lines in FIG. 1, thereby permitting the first racked-section of ejection rod 6 to be moved rearwardly in the connector body by pushing push button 10. When the card 4 is in use and removal of the card is neither necessary nor wanted, push button 10 is moved to its inoperative position, i.e. such that the rectangular head is in the second head-holding section 14, as shown in FIG. 1. In its inoperative position, push button 10 lies close enough to the edge of the card body that there is no fear of push button 10 being inadvertently actuated and unintentionally ejected.

Figure 2:
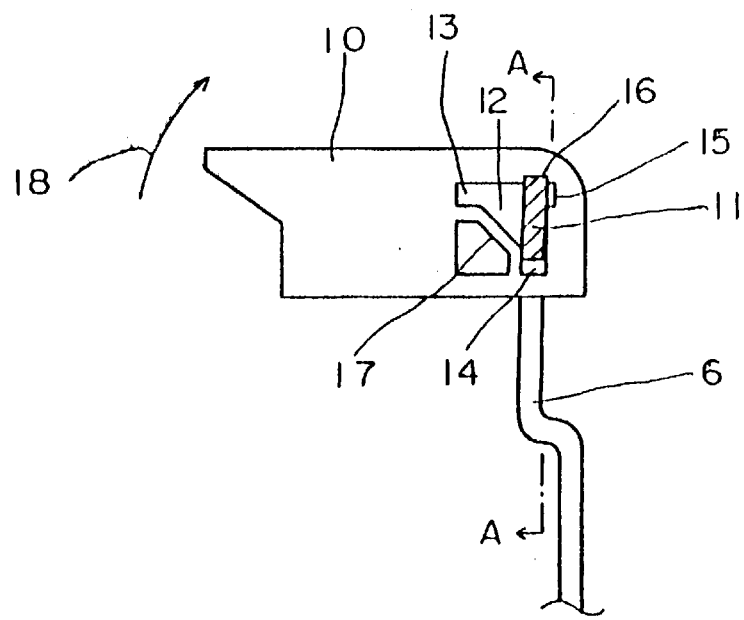
FIG. 2 illustrates the push button in its inoperative position.
Figure 3:
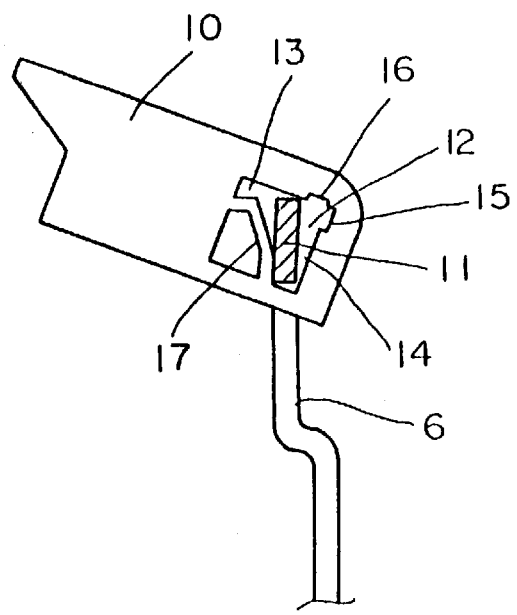
FIG. 3 illustrates the push button in an intermediate position; between its operative and inoperative positions.
Figure 4:
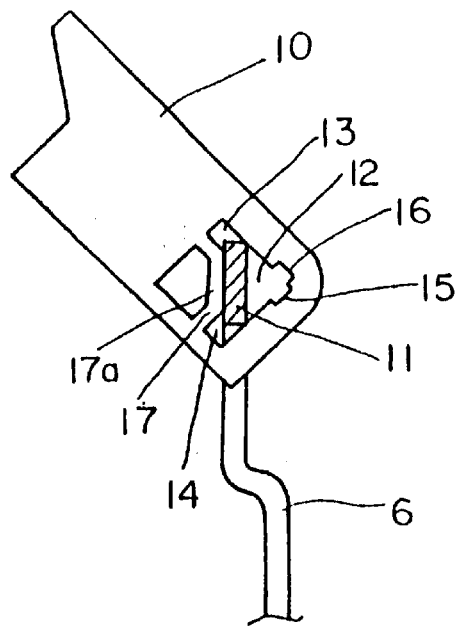
FIG. 4 illustrates the push button in still another intermediate position between its operative and inoperative positions.
Figure 5:
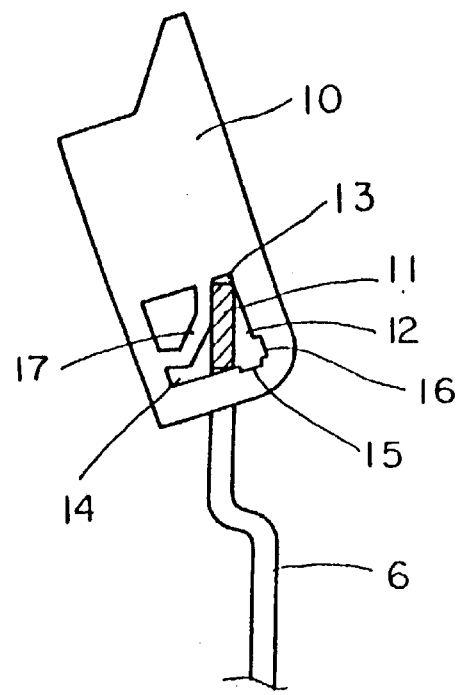
FIG. 5 illustrates the push button in still another intermediate position between its operative and inoperative positions.

FIGS. 2 through 6 show how push button 10 is moved from its inoperative to its operative position. As seen in FIG. 2, flat head 11 of ejection rod 6 is positioned in second head-holding section 14 with one end of head 11 located within U-shaped space 16. Push button 10 is rotated by applying a force in a direction indicated by arrow 18, causing head 11 to move out of U-shaped space 16. This causes resilient section 17 to be deformed by head 11 which in turn causes a resilient force to push head 11 towards an edge of L-shaped slot 12 as a counter action (FIG. 3).

Rotation of push button 10 continues to put head 11 in parallel with oblique wall 17a, allowing resilient section 17 to return to its original, undeformed state, and providing an audible click and tactile feel (see FIG. 4) to allow a user to know the position has been changed. Further continued rotation of push button 10 causes resilient section 17 to deform as head 11 is pushed toward the first head-holding position (see FIG. 5).

Figure 6:
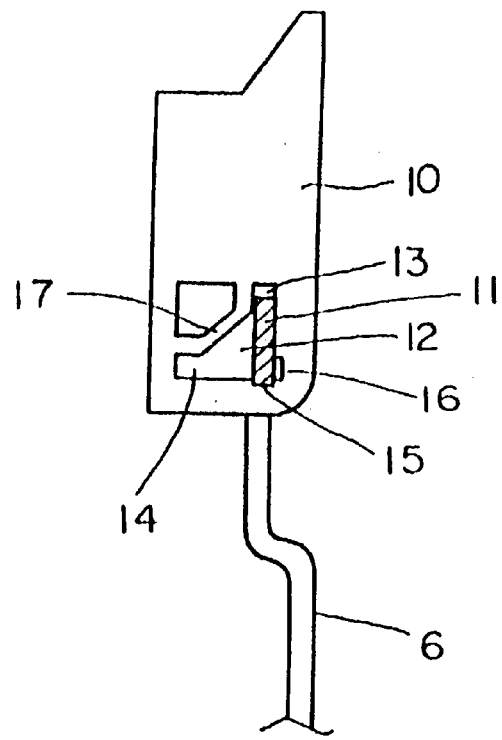
FIG. 6 illustrates the push button in its operative position.
Figure 7:
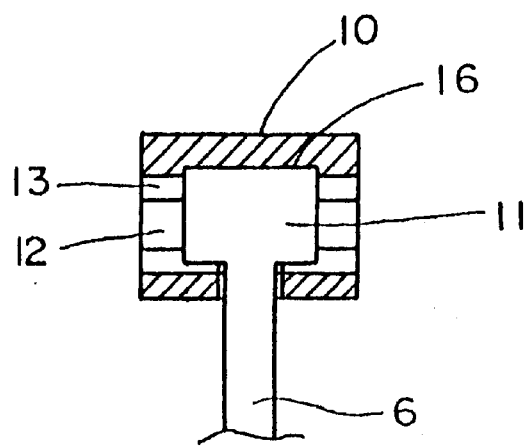
FIG. 7 is a sectional view of the push button taken along line A—A of FIG. 2.

Still further continued rotation of push button 10 causes head 11 to be move into first head-holding section 13, allowing resilient section 17 to return to its original, undeformed state, and providing another audible click and tactile feedback(see FIG. 6). In this position, push button 10 is in its operative position and is generally in alignment and positive engagement with ejection rod 6 with head 11 positioned in U-shaped space 15 of first head-holding section 13.

Force applied to push button 10 in the operative position shown in FIG. 6 causes first racked-section 6a of ejection rod 6 to rotate pinion gear 9, thereby driving second racked-section 8a of ejection rod 8 in a direction indicated by arrow 20 in FIG. 1. This causes card 4 to be ejected in the direction of arrow 20 out of engagement with the card connector and to be extracted by a user.

When it is desired that push button 10 be moved to its inoperative position, as in FIG. 2), push button 10 is rotated in reverse, following the sequential positions starting from FIG. 6 and going to FIG. 2, again feeling and hearing the tactile and audible feedback created by the movement of the head within the head-retaining section.

Figure 8:
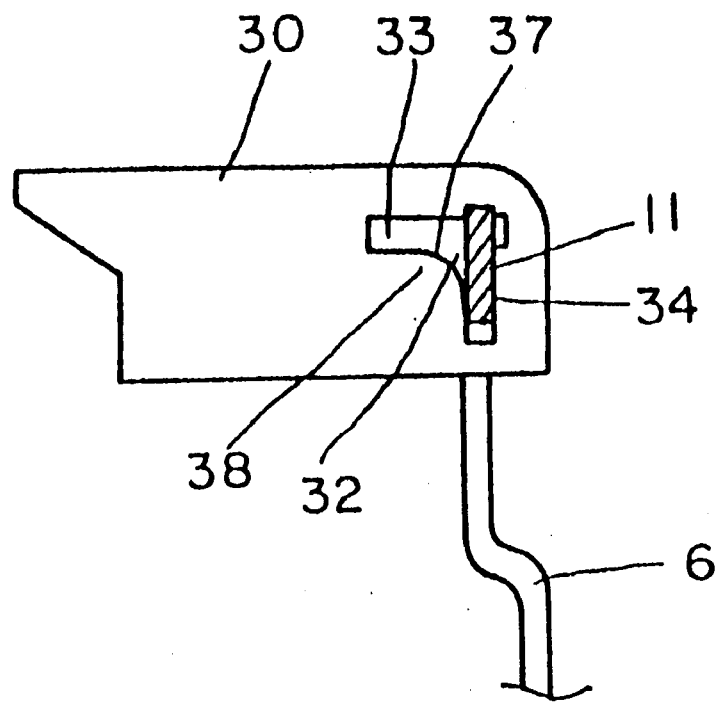
FIG. 8 illustrates a second embodiment of the push button in its inoperative position.

FIG. 8 shows a second embodiment of a molded push button 30 according to the invention. Push button 30 includes an L-shaped slot defining first and second head-holding sections 33 and 34. Curved projection 38 in head-retaining space 32 functions to provide a resilient force to head 11 while moving between its operative and inoperative positions. Push button 30 moves between its two positions in substantially the same way as push button 10. As with resilient section 17, curved projection 38 is deformed to provide an audible click when head 11 moves toward its operative or inoperative position.

Push buttons 10 and 30 are described as having first and second head-holding sections 13 and 14, and 33 and 34, respectively. The second head-holding section, however, may be a head-resting or head-withdrawing section. In this alternative, the push button can still provide sensory feedback when moving between its operative and inoperative positions.

The present invention is described above as being applied to a card connector which is designed according to the PCMCIA standard. It can be equally applied to a drive devices such as a DVD, MO or MD or other card connectors equipped with eject mechanisms.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An eject mechanism for ejecting a card from a card-receiving electrical connector, comprising:

an elongated ejection rod (6) mounted along one side of the connector and having a rectangular flat head (11) formed at one end thereof; and a generally rectangular push button (30) attached directly to the ejection rod for rotatable movement between an operative position and an inoperative position and including a head-retaining space (12) formed at one end thereof for receiving the rectangular flat head (11) of the ejection rod (6), wherein the head-retaining space (12) includes a generally L-shaped slot having a first head-holding section (13) extending in a direction along the longitudinal dimension of the push button (10) for holding the push button in its operative position, and a second head-holding section (14) extending generally perpendicular to the first head-holding section for holding the push button in its inoperative position, whereby, when the head of the ejection rod is in the first head-holding section, the push button is aligned with the ejection rod and a user can apply force to the push button to eject the card from the electrical connector.

2. The eject mechanism as set forth in claim 1 wherein the head-retaining space further includes a resilient section (17) adjacent the L-shaped slot adapted to apply a resilient force to the head of the ejection rod during movement of the push button between its operative and inoperative positions.

3. The eject mechanism as set forth in claim 2 wherein the resilient section (17) comprises a deformable oblique wall (17a).

4. The eject mechanism as set forth in claim 1 wherein the first head-holding section and the second head-holding section of the push button include U-shaped engagement recesses (15,16) into which a portion of the head of the ejection rod is positioned in the operative and inoperative positions of the push button, respectively.

5. An eject mechanism for an electrical connector comprising:

a generally elongated ejection rod (6) having a head (11) formed at one end thereof; and a generally rectangular push button (30) rotatably attached to the ejection rod for movement between an operative and an inoperative position and including a head-retaining space (12) formed at one end thereof for receiving the head (11) of the ejection rod (6), wherein the head-retaining space (12) of the push button includes a generally L-shaped slot having a first head-holding section (13) extending in a direction generally parallel to the longitudinal dimension of the push button (10), and a second head-holding section (14) extending generally perpendicular to the first head-holding section, whereby when the head of the ejection rod is in the first head-holding section of the head-retaining space, the push button is in its operative position and a user can apply force to the push button to eject a device from the electrical connector.

6. The eject mechanism of claim 5 wherein the head-retaining space of the push button further comprises a resilient section (17) for providing a force on the head of the ejection rod during movement of the push button between its operative and inoperative positions.

* * * * *